United States Patent [19]
Cosey, Sr.

[11] Patent Number: 5,493,451
[45] Date of Patent: Feb. 20, 1996

[54] VARIABLE HEIGHT MAGNIFIER

[76] Inventor: Lurinzo Cosey, Sr., 4307 Hancock Dr., Memphis, Tenn. 38116

[21] Appl. No.: 342,820

[22] Filed: Nov. 21, 1994

[51] Int. Cl.⁶ ............................................. G02B 7/02
[52] U.S. Cl. ..................... 359/817; 359/809; 359/818
[58] Field of Search .................................. 359/802–805, 359/807, 809–812, 819, 818, 817, 609, 610, 612, 613; 248/291, 298, 316.5

[56] References Cited

U.S. PATENT DOCUMENTS 4,574,505  3/1986  Chiodo ................................. 359/817
4,958,907  9/1990  Davis .................................... 359/809

Primary Examiner—Loha Ben

[57] ABSTRACT

A magnifier for optically enlarging objects placed therebeneath. The inventive device includes a frame supporting a substantially rectangular magnifying glass. A pair of support assemblies extend from opposed sides of the frame and cooperate to support the magnifying glass above a support surface. The support assemblies can be adjusted in infinitely small increments to position the magnifying glass at a desired height and to effect focusing of the device.

7 Claims, 3 Drawing Sheets

VARIABLE HEIGHT MAGNIFIER

BACKGROUND OF THE INVENTION

1. Field of the Invention

The present invention relates to optical modification devices and more particularly pertains to a variable height magnifier for optically enlarging objects placed therebeneath.

2. Description of the Prior Art

The use of optical modification devices is known in the prior art. More specifically, optical modification devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art optical modification devices include U.S. Pat. No. 5,267,716; U.S. Pat. No. 4,133,603; U.S. Pat. No. 4,293,190; U.S. Pat. No. 4,632,511; U.S. Pat. No. 4,379,618; and U.S. Pat. No. 4,944,574.

While these devices fulfill their respective, particular objectives and requirements, the aforementioned patents do not disclose a variable height magnifier for optically enlarging objects placed therebeneath which includes a frame supporting a substantially rectangular magnifying glass therein, and a pair of support assemblies extending from opposed sides of the frame which cooperate to support the magnifying glass above a support surface.

In these respects, the variable height magnifier according to the present invention substantially departs from the conventional concepts and designs of the prior art, and in so doing provides an apparatus primarily developed for the purpose of optically enlarging objects placed therebeneath.

SUMMARY OF THE INVENTION

In view of the foregoing disadvantages inherent in the known types of optical modification devices now present in the prior art, the present invention provides a new variable height magnifier construction wherein the same can be utilized for optically enlarging objects placed therebeneath. As such, the general purpose of the present invention, which will be described subsequently in greater detail, is to provide a new variable height magnifier apparatus and method which has many of the advantages of the optical modification devices mentioned heretofore and many novel features that result in a variable height magnifier which is not anticipated, rendered obvious, suggested, or even implied by any of the prior art optical modification devices, either alone or in any combination thereof.

To attain this, the present invention generally comprises a magnifier for enlarging objects placed therebeneath. The inventive device includes a frame supporting a substantially rectangular magnifying glass. A pair of support assemblies extend from opposed sides of the frame and cooperate to support the magnifying glass above a support surface. The support assemblies can be adjusted in infinitely small increments to position the magnifying glass at a desired height and to effect focusing of the device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new variable height magnifier apparatus and method which has many of the advantages of the optical modification devices mentioned heretofore and many novel features that result in a variable height magnifier which is not anticipated, rendered obvious, suggested, or even implied by any of the prior art optical modification devices, either alone or in any combination thereof.

It is another object of the present invention to provide a new variable height magnifier which may be easily and efficiently manufactured and marketed.

It is a further object of the present invention to provide a new variable height magnifier which is of a durable and reliable construction.

An even further object of the present invention is to provide a new variable height magnifier which is susceptible of a low cost of manufacture with regard to both materials and labor, and which accordingly is then susceptible of low prices of sale to the consuming public, thereby making such variable height magnifiers economically available to the buying public.

Still yet another object of the present invention is to provide a new variable height magnifier which provides in the apparatuses and methods of the prior art some of the advantages thereof, while simultaneously overcoming some of the disadvantages normally associated therewith.

Still another object of the present invention is to provide a new variable height magnifier for optically enlarging objects placed therebeneath.

Yet another object of the present invention is to provide a new variable height magnifier which includes a frame supporting a substantially rectangular magnifying glass therein, and a pair of support assemblies extending from opposed sides of the frame which cooperate to support the magnifying glass above a support surface.

Even still another object of the present invention is to provide a new variable height magnifier in which the support assemblies can be adjusted in infinitely small increments to position the magnifying glass at a desired height and to effect focusing of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
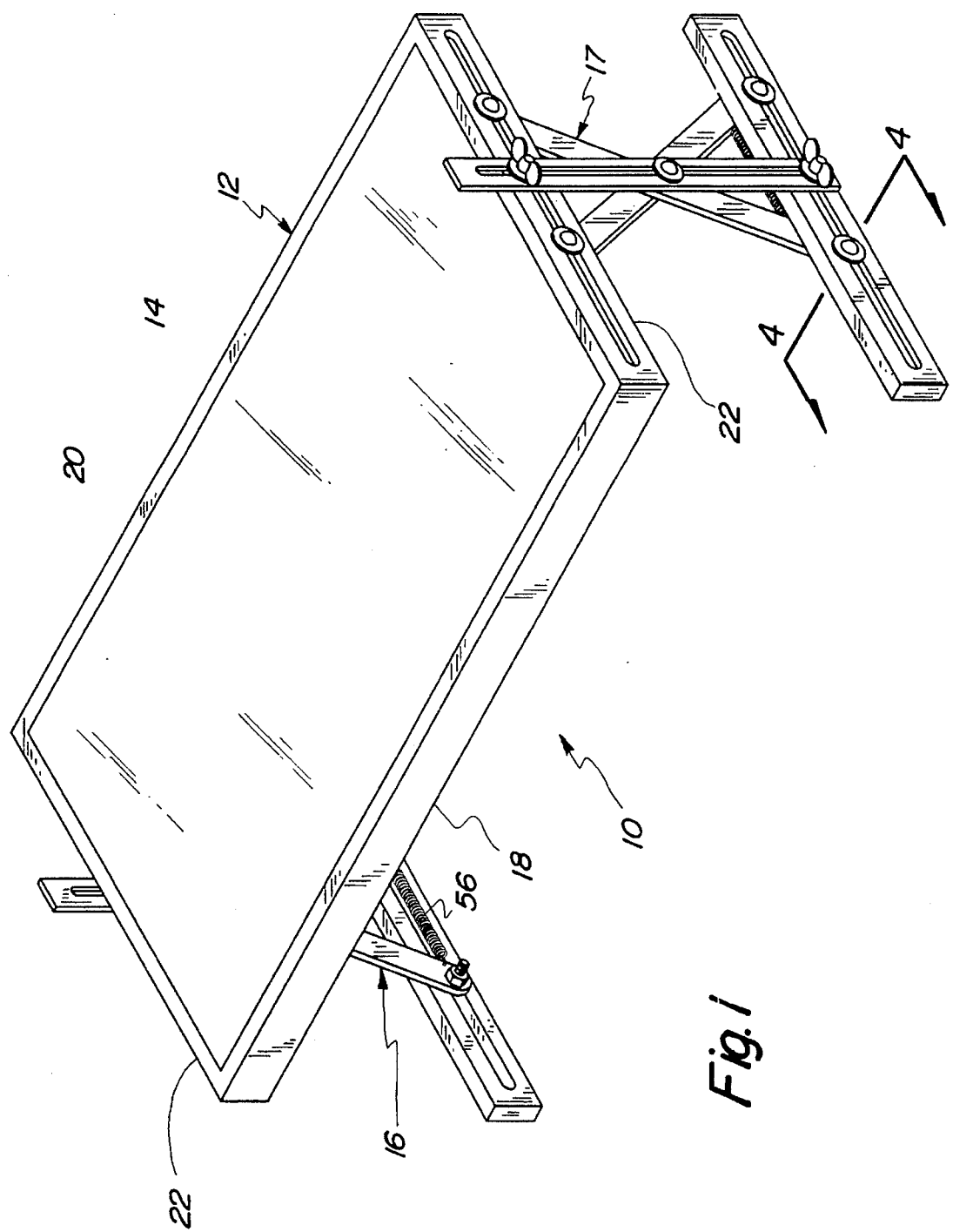
FIG. 1 is an isometric illustration of a variable height magnifier according to the present invention.

With reference now to the drawings, and in particular to FIGS. 1–5 thereof, a new variable height magnifier embodying the principles and concepts of the present invention and generally designated by the reference numeral 10 will be described.

Figure 2:
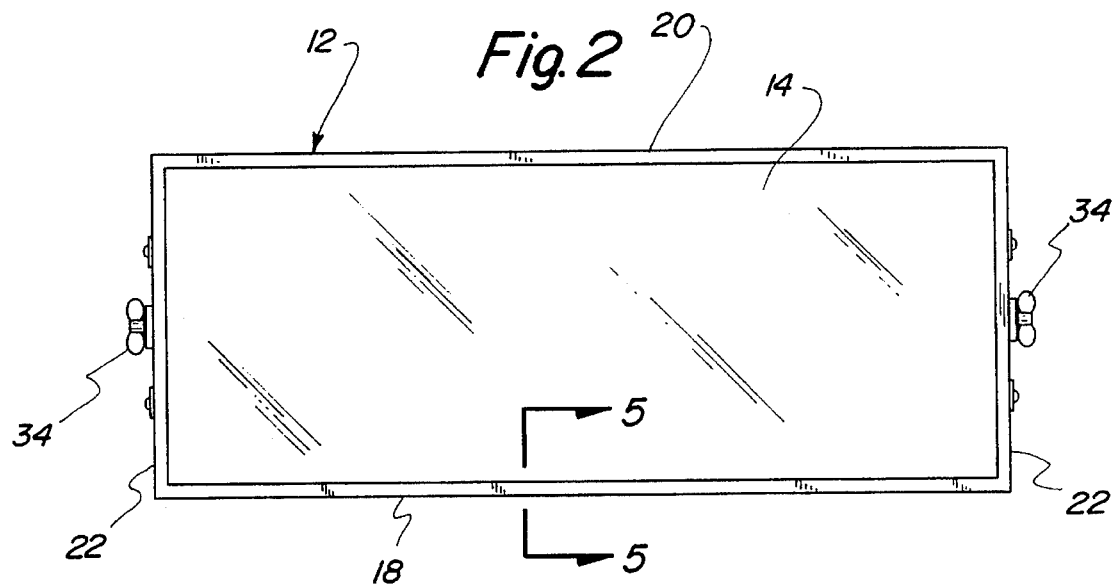
FIG. 2 is a top plan view thereof.
Figure 5:
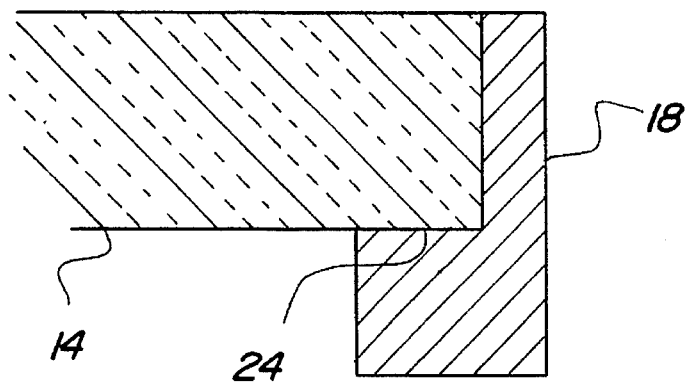
FIG. 5 is a further cross sectional view taken along line 5—5 of FIG. 2.

More specifically, it will be noted that the variable height magnifier 10 comprises a frame means 12 for receiving and supporting a magnifying glass 14 of substantially rectangular configuration. A pair of support means 16 are coupled to laterally opposed sides of the frame means 12 and cooperate to support the frame means and the associated magnifying glass 14 in a spaced relationship relative to an underlying support surface. As best illustrated in FIGS. 1 and 2, the frame means 12 comprises a substantially elongated front member 18 spaced from and parallel to a similarly shaped rear member 20, with a pair of lateral members 22 extending orthogonally between the front and rear members to define the substantially rectangular shape of the frame means 12. As shown in FIG. 5, each of the members 18–22 includes an orthogonal recess 24 directed thereinto upon which a perimeter edge of the magnifying glass 14 can rest. The magnifying glass 14 can be gravitationally or frictionally retained relative to the members 18–22, or alternatively can be adhesively or mechanically retained through the use of adhesives, or mechanical fasteners, respectively. The magnifying glass 14 is operable to optically enlarge objects placed therebeneath.

Figure 3:
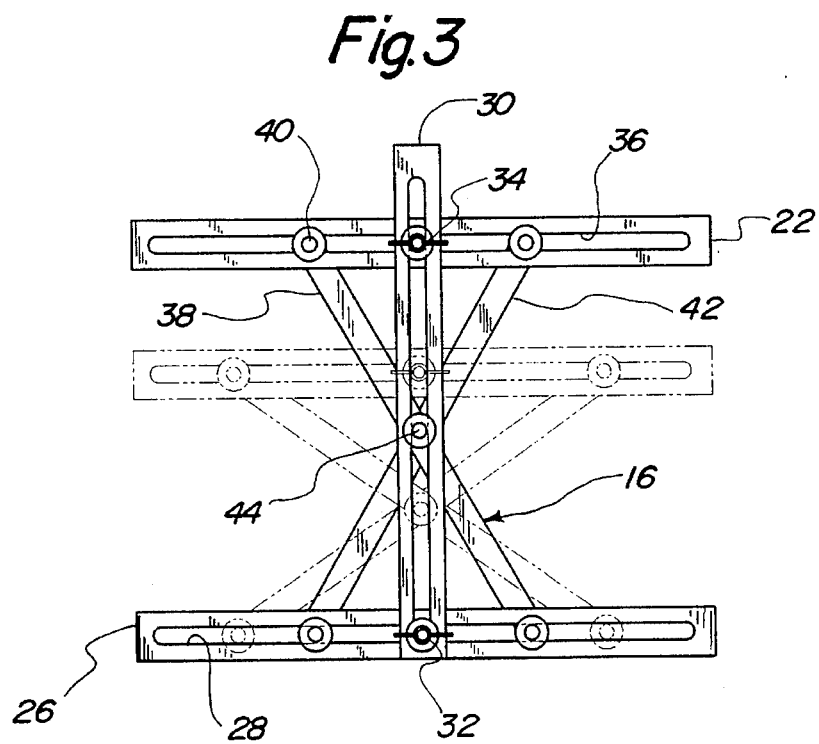
FIG. 3 is a side elevation view of the invention illustrating an adjustment of the support means.

As shown in FIG. 3, each of the support means 16 comprises a base member 26 of substantially elongated configuration and including an elongated slot 28 directed longitudinally therealong and extending therethrough. The base member 26 is operable to be positioned onto a support surface with the elongated slot 28 extending through the base member and parallel to the support surface. A center leg is adjustably coupled to the base member 26 by a wing nut fastener 32 which extends through the elongated slot 28 of the base member and an unlabeled elongated slot extending through the center leg. The center leg 30 can be positioned so as to project upwardly from the base member 26 and is movably coupled to the respective lateral member 22 by a further wing nut fastener 34 extending through the center leg elongated slot and through a lateral member elongated slot 36 formed in the lateral member 22. By this structure, the further wing nut fastener 34 can be selectively loosened to permit vertical adjustment of the lateral member 22 of the frame means 12 relative to the base member 26 and the underlying support surface.

To impart rotational stability to the frame means 12 relative to a horizontal axis directed through the further wing nut fastener 34, the support means 16 further comprises a first support leg 38 movably coupled to the respective lateral member 22 at a first end thereof by a sliding axle 40 projecting through the lateral member elongated slot 36. The first support leg 38 is further movably mounted at a second end thereof to the base member 26 by a further sliding axle which extends through the elongated slot 28 of the base member 26. Similarly, a second support leg 42 is movably mounted to the respective lateral member 22 at a first end thereof and extends downwardly to movably couple with the base member 26. The first and second support legs 38, 42 are oriented at an oblique angle relative to one another and are pivotally coupled together at centers thereof by a center axle 44 which extends through the center leg elongated slot. The first and second support legs 38, 42 cooperate to maintain the frame means 12 in a substantially parallel orientation relative to the base member 26 and the underlying support surface.

Figure 4:
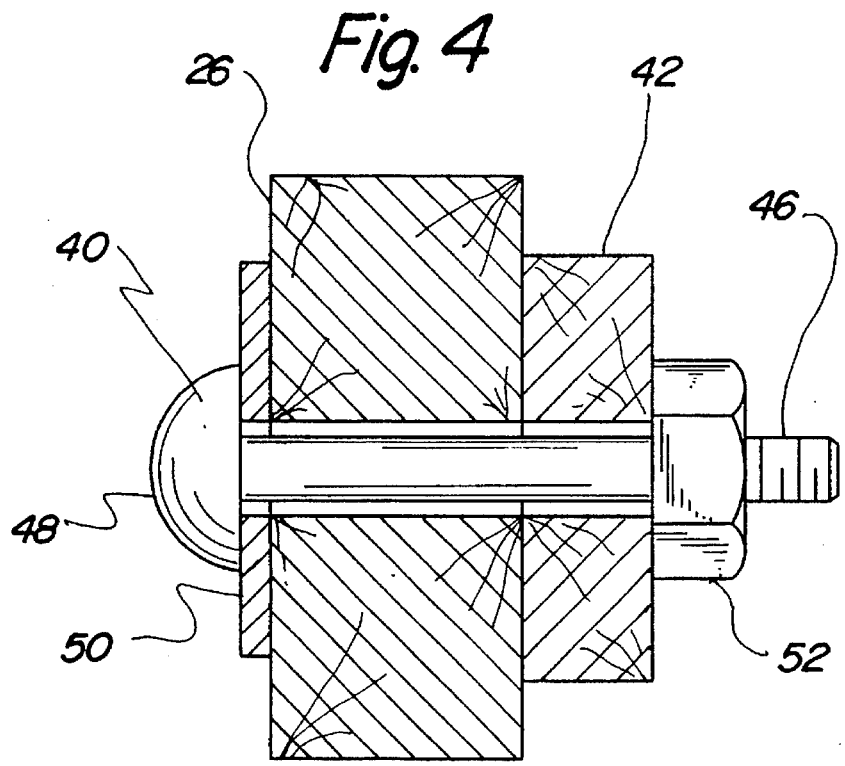
FIG. 4 is a cross sectional view taken along line 4—4 of FIG. 1.

As shown in FIG. 4, each of the sliding axles 40 comprises a threaded fastener 46 having a hemi-spherical head 48 which projects through a washer 50 to engage a securing nut 52. Each of the sliding axles 40 is substantially similar in shape and for this particular axle illustrated in FIG. 4, the axle projects through the base member elongated slot 28 of the base member 26, as well as an unlabeled aperture in the second end of the second support leg 42 to movably couple the support leg to the base member 26. The securing nut 52 of each of the sliding axles 40 can be left slightly loose so as to permit sliding adjustment of the support legs 38, 42 as desired, or alternatively, can be securely tightened to further secure the support means 16 in a desired position.

In use, the variable height magnifier 10 according to present invention can be positioned on a support surface over items such as a computer keyboard, a book, a newspaper, a map, or other object to be magnified. The support means 16 can then be selectively adjusted through a loosening of the upper most wing nut 34 and the securing nuts 52 if so tightened to effect movement of the frame means 12 relative to the base member 26 and the underlying support surface. To provide for balancing of the support means 16 relative to a weight of the frame means 12 and the magnifying glass 14 combined, an elongated tension spring 56 can extend between the lower ends of the support legs 38, 42. Subsequent to a positioning of the frame means and associated magnifying glass 14 at a desired height, the further wing nuts 34 can be selectively tightened to secure such position, with the securing nut 52 of the sliding axles 40 being further securable to additionally lock the support means 16 at a desired height.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A variable height magnifier comprising:

a magnifying glass;

a frame means for receiving and supporting said magnifying glass, said frame means comprising a substantially elongated front member spaced from and parallel to a similarly shaped rear member, with a pair of lateral members extending orthogonally between said front and rear members to define a substantially rectangular shape of said frame means, said members each including an orthogonal recess directed thereinto upon which a perimeter edge of said magnifying glass is positioned and secured thereto, each of said lateral members including a lateral member elongated slot extending therethrough;

and, a pair of support means coupled to laterally opposed sides of said frame means for supporting said frame means and said magnifying glass in a spaced relationship relative to an underlying support surface, each of said support means comprising a base member of substantially elongated configuration and including an elongated slot directed longitudinally therealong and extending therethrough, said base member being positionable onto said support surface with said elongated slot extending through said base member and parallel to said support surface; a center leg having an elongated slot and being adjustably coupled to said base member by a wing nut fastener extending through said elongated slot of said base member and said elongated slot extending through said center leg, said center leg being positioned so as to project upwardly from said base member and movably coupled to an individual one of said lateral members by a further wing nut fastener extending through said center leg elongated slot and through said lateral member elongated slot formed in said lateral member.

2. The variable height magnifier of claim 1, wherein said support means further comprises a first support leg movably coupled to said lateral member at a first end thereof; a first sliding axle projecting through said lateral member elongated slot and through said first end of said first support leg, said first support leg being movably mounted at a second end thereof to said base member; a further first sliding axle extending through said elongated slot of said base member and said second end of said first support leg; a second support leg movably coupled to said lateral member at a first end thereof; a second sliding axle projecting through said lateral member elongated slot and through said first end of said second support leg, said second support leg being movably mounted at a second end thereof to said base member; and a further second sliding axle extending through said elongated slot of said base member and said second end of said second support leg, said first and second support legs being oriented at an oblique angle relative to one another and pivotally coupled together at centers thereof.

3. The variable height magnifier of claim 2, wherein each of said support means further comprises an elongated tension spring extending between said second ends of said support legs.

4. A variable height magnifier comprising:

a magnifying glass;

a frame means for receiving and supporting said magnifying glass, said frame means comprising a substantially elongated front member spaced from and parallel to a similarly shaped rear member, with a pair of lateral members extending orthogonally between said front and rear members to define a substantially rectangular shape of said frame means, said members each including an orthogonal recess directed thereinto upon which a perimeter edge of said magnifying glass is positioned and secured thereto, each of said lateral members including a lateral member elongated slot extending therethrough;

and, a pair of support means coupled to laterally opposed sides of said frame means for supporting said frame means and said magnifying glass in a spaced relationship relative to an underlying support surface, each of said support means comprises a base member of substantially elongated configuration and including an elongated slot directed longitudinally therealong and extending therethrough, said base member being positionable onto said support surface with said elongated slot extending through said base member and parallel to said support surface; a center leg having an elongated slot and being adjustably coupled to said base member by a wing nut fastener extending through said elongated slot of said base member and said elongated slot extending through said center leg, said center leg being positioned so as to project upwardly from said base member and movably coupled to an individual one of said lateral members by a further wing nut fastener extending through said center leg elongated slot and through said lateral member elongated slot formed in said lateral member, said support means further comprising a first support leg movably coupled to said lateral member at a first end thereof; a first sliding axle projecting through said lateral member elongated slot and through said first end of said first support leg, said first support leg being movably mounted at a second end thereof to said base member; a further first sliding axle extending through said elongated slot of said base member and said second end of said first support leg; a second support leg movably coupled to said lateral member at a first end thereof; a second sliding axle projecting through said lateral member elongated slot and through said first end of said second support leg, said second support leg being movably mounted at a second end thereof to said base member; a further second sliding axle extending through said elongated slot of said base member and said second end of said second support leg, said first and second support legs being oriented at an oblique angle relative to one another and pivotally coupled together at centers thereof; and an elongated tension spring extending between said second ends of said support legs, wherein each of said sliding axles comprises a threaded fastener having a hemi-spherical head; and a securing nut threadably engaged to said threaded fastener.

5. A variable height magnifier comprising:

a magnifying glass;

a frame means for receiving and supporting said magnifying glass, said frame means comprising a substantially elongated front member spaced from a similarly shaped rear member, with a pair of lateral members extending between said front and rear members, each of said lateral members including a lateral member elongated slot extending therethrough;

and, a pair of support means coupled to laterally opposed sides of said frame means for supporting said frame means and said magnifying glass in a spaced relationship relative to an underlying support surface, each of said support means comprising a base member of substantially elongated configuration and including an elongated slot directed longitudinally therealong and extending therethrough, said base member being positionable onto said support surface with said elongated slot extending through said base member and parallel to said support surface; a center leg having an elongated slot and being adjustably coupled to said base member by a wing nut fastener extending through said elongated slot of said base member and said elongated slot extending through said center leg, said center leg being positioned so as to project upwardly from said base member and movably coupled to an individual one of said lateral members by a further wing nut fastener extending through said center leg elongated slot and through said lateral member elongated slot formed in said lateral member.

6. The variable height magnifier of claim 5, wherein said support means further comprises a first support leg movably coupled to said lateral member at a first end thereof; a first sliding axle projecting through said lateral member elongated slot and through said first end of said first support leg, said first support leg being movably mounted at a second end thereof to said base member; a further first sliding axle extending through said elongated slot of said base member and said second end of said first support leg; a second support leg movably coupled to said lateral member at a first end thereof; a second sliding axle projecting through said lateral member elongated slot and through said first end of said second support leg, said second support leg being movably mounted at a second end thereof to said base member; and a further second sliding axle extending through said elongated slot of said base member and said second end of said second support leg, said first and second support legs being oriented at an oblique angle relative to one another and pivotally coupled together at centers thereof.

7. The variable height magnifier of claim 6, wherein each of said support means further comprises an elongated tension spring extending between said second ends of said support legs.

* * * * *